(12) United States Patent
Saiki et al.

(10) Patent No.: US 9,870,913 B2
(45) Date of Patent: Jan. 16, 2018

(54) FLASH DISCHARGE TUBE AND LIGHT-EMITTING DEVICE EQUIPPED WITH THE FLASH DISCHARGE TUBE

(71) Applicant: Panasonic Intellectual Property Management Co., Ltd., Osaka (JP)

(72) Inventors: Hiroshi Saiki, Kyoto (JP); Shinji Kihara, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/509,944

(22) PCT Filed: Jun. 29, 2016

(86) PCT No.: PCT/JP2016/003115
§ 371 (c)(1),
(2) Date: Mar. 9, 2017

(87) PCT Pub. No.: WO2017/006541
PCT Pub. Date: Jan. 12, 2017

(65) Prior Publication Data
US 2017/0309466 A1     Oct. 26, 2017

(30) Foreign Application Priority Data

Jul. 8, 2015   (JP) .................................. 2015-136585

(51) Int. Cl.
*H01J 17/44*     (2006.01)
*H01J 61/54*     (2006.01)
(Continued)

(52) U.S. Cl.
CPC .......... *H01J 61/547* (2013.01); *H01J 61/302* (2013.01); *H01J 61/366* (2013.01); *G03B 15/04* (2013.01); *G09F 13/26* (2013.01); *G09F 13/44* (2013.01)

(58) Field of Classification Search
CPC ...... H01J 61/547; H01J 61/302; H01J 61/366; G09F 13/44; G09F 13/26; G03B 15/04
See application file for complete search history.

(56) References Cited

U.S. PATENT DOCUMENTS

| | | | |
|---|---|---|---|
| 6,960,883 B2 * | 11/2005 | Mizoziri | H01J 61/547 313/234 |
| 8,922,105 B2 * | 12/2014 | Nomoto | H01J 7/30 313/234 |
| 2012/0112632 A1 * | 5/2012 | Saiki | H01J 61/0732 313/623 |

FOREIGN PATENT DOCUMENTS

| | | |
|---|---|---|
| JP | 11-238489 | 8/1999 |
| JP | 5262911 B | 8/2013 |

OTHER PUBLICATIONS

International Search Report of PCT application No. PCT/JP2016/003115 dated Sep. 6, 2016.

* cited by examiner

*Primary Examiner* — Tracie Y Green
(74) *Attorney, Agent, or Firm* — McDermott Will & Emery LLP (57) ABSTRACT

A flash discharge tube includes tungsten pins configuring a pair of discharge electrodes, and an envelope. The envelope includes a central region, serving as an alkali-free region, which is configured with an alkali-free glass except for quartz glass. The central region becomes in a high temperature state during a firing operation of the flash discharge tube. The central region is smaller than a maximum region (Continued)

enclosing a gas-tight space formed by hermetically sealing the pair of the discharge electrodes and is not smaller than a minimum region enclosing an arc-discharge space formed between the tungsten pins of the pair of the discharge electrodes. The alkali-free region contains either no alkali metal component or not larger than a predetermined amount of an alkali metal component. Then, a trigger electrode is disposed in the alkali-free region. This provides the flash discharge tube featuring a stable short-interval continuous-firing operation.

6 Claims, 6 Drawing Sheets

(51) Int. Cl.
     *H01J 61/30*          (2006.01)
     *H01J 61/36*          (2006.01)
     *G03B 15/04*          (2006.01)
     *G09F 13/26*          (2006.01)
     *G09F 13/44*          (2006.01)

FLASH DISCHARGE TUBE AND LIGHT-EMITTING DEVICE EQUIPPED WITH THE FLASH DISCHARGE TUBE

This application is a U.S. national stage application of the PCT international application No. PCT/JP2016/003115.

TECHNICAL FIELD

The present invention relates to flash discharge tubes that emit light upon being excited by trigger circuits, and to light-emitting devices that are equipped with the flash discharge tube serving as light source loads.

BACKGROUND ART

Flash discharge tubes have conventionally been known, each of which is configured with a light-transmitting envelope and discharge electrodes which are hermetically sealed at the both ends of the envelope, with a xenon gas being sealed in the inside of the envelope. A high-frequency signal, so-called trigger signal, output from a trigger circuit is applied to the flash discharge tube via the envelope. This causes the flash discharge tube to emit a large amount of light instantaneously.

Moreover, light-emitting devices have been known, each of which is equipped with the flash discharge tube having the configuration described above, with the tube serving as a light source load. Such light-emitting devices include: stroboscopic devices used as artificial light sources for illuminating subjects to be photographed, and light-emitting devices used as eye-catching means for advertisements, for example.

As one of the firing operation modes of the light-emitting devices described above, a short-interval continuous-firing operation mode has been known in which the light-emitting device is fired many times continuously at short time intervals.

The short-interval continuous-firing operation mode is a firing operation mode in which firing is repeated at short time intervals of not longer than one second, for example. Specifically, with the stroboscopic devices described above, such a firing operation mode is used to check to see the effects (e.g. influence of shadow-castings) of illumination for photographing, in advance of the photographing. With the light-emitting devices for eye-catching of advertisements described above, the firing operation modes include a blink-firing operation mode which is used to more enhance the effects of the eye-catching of advertisements. In recent years, it has been desired for the short-interval continuous-firing operation mode to be able to offer the larger number of firing times in the continuous-firing operation.

Unfortunately, the flash discharge tube generates heat associated with the firing operation. Accordingly, during the continuous-firing operation, the heat is accumulated with an increasing number of firing times in the continuous-firing, resulting in high temperatures of the flash discharge tube. This sometimes hinders the tube from being fired, resulting in so-called misfiring.

For the reason described above, it is difficult to freely increase the number of firing times in the continuous firing. Thus, in general, a firing-halt period is forcibly introduced as needed for the flash discharge tube. Such a firing-halt period begins after predetermined firing times in the continuous-firing operation of the tube. With this configuration, the aforementioned light-emitting devices and the like can control their firing operation in the continuous-firing operation mode, thereby preventing their flash discharge tubes from being excessively heated to high temperatures.

Hereinafter, factors in hindering the firing operation of the flash discharge tube in a high temperature state will be considered.

First, an increase in charged pressure of the xenon gas is expected to be a factor; such an increase in charged pressure is due to the thermal expansion of the xenon gas that has been sealed in the inside of the envelope of the flash discharge tube. The increase in the charged pressure of the xenon gas results in restricted mobility of electrons in the inside of the envelope. In this case, generation of an arc discharge, being a firing operation, requires energies including: a larger amount of energy that is supplied to an interelectrode between the anode and cathode, and a larger amount of energy of a trigger signal that is applied to a trigger electrode. That is, such changes in the charged pressure in the high temperature state are considered to tend to hinder the firing operation of the flash discharge tube.

Moreover, a damping phenomenon of output of the trigger signal is expected to be a factor; such a phenomenon is associated with the temperature rise of the flash discharge tube.

Here, the damping phenomenon of the output will be briefly described below.

Usually, during an early period of the firing operation, an output waveform of a trigger signal in the continuous-firing operation is observed to be a vibrational waveform that has desirably-high peaks. However, as the number of firing times in the continuous firing increases, the flash discharge tube becomes in a high temperature state and tends to cause misfires, for example. In this state, the output waveform is observed to have largely-decreased peaks. This is the so-called damping phenomenon.

That is, such a damping phenomenon of the output waveform of the trigger signal means a reduction in the ability of the trigger signal to attract and induce electron emission from the cathode and to excite the xenon gas that has been sealed in. This, in turn, means a reduction in the so-called triggering ability to help the flash discharge tube start the firing operation. For this reason, in the case where the continuous-firing operation of the flash discharge tube is continued, the damping phenomenon of output of the trigger signal is considered to be a factor in causing misfires. Such a factor acts in cooperation with other factors in causing misfires, with the factors resulting from the aforementioned increase in the charged pressure of the xenon gas, for example.

Then, the present inventors consider that a factor responsible for the aforementioned damping of waveform of the trigger signal is attributed to a composition of glass that configures the envelope of the flash discharge tube, which is described below.

That is, in order for the flash discharge tube to cause an arc discharge phenomenon to emit light, electrode pins of the flash discharge tube are each commonly made with tungsten, i.e. a refractory metal material, which can withstand a large electric current that flows instantaneously through the pins. Accordingly, the envelope of the flash discharge tube is commonly made of a well-known borosilicate glass, i.e. a hard glass for use in sealing tungsten (a tungsten-sealing glass), which has a thermal expansion coefficient close to that of tungsten.

Specifically, for tungsten having a thermal expansion coefficient ranging from $4.4 \times 10^{-6}$ $K^{-1}$ to $4.5 \times 10^{-6}$ $K^{-1}$, borosilicate glass is commonly used which has a thermal expansion coefficient ranging from $3.2 \times 10^{-6}$ $K^{-1}$ to $4.1 \times$ $10^{-6}$ K$^{-1}$ that is comparable to that of tungsten. This configuration prevents occurrence of faults in hermetic sealing due to a difference between the thermal expansion coefficients.

Unfortunately, the borosilicate glass is known to vary in electrical characteristics as it becomes in a high temperature state. Specifically, the borosilicate glass has unfavorable characteristics in which its relative dielectric constant and dielectric loss factor increase with rising temperature, resulting in its reduced line resistance, for example. Such variations in the electrical characteristics will cause energy consumption of the trigger signal when the trigger signal is applied to the trigger electrode, in accordance with states and circumstances of the variations in the electrical characteristics.

The reason for this will be specifically described hereinafter.

First, in the case where the glass becomes in a high temperature state, the volume resistivity of the glass tube itself decreases due to factors to be described below, resulting in an increase in the amount of energy consumption of the trigger signal at the glass tube. That is, when viewed from the xenon gas inside the glass tube and an emitter impregnated in the cathode which both need energy, some amount of the energy of the trigger signal has already been consumed at the glass tube in the high temperature state. For this reason, the xenon gas and emitter in the inside of the glass tube cannot receive a sufficient amount of the energy of the trigger signal that is inputted to the glass tube. As a result, the xenon gas is not excited sufficiently, which causes misfires. Moreover, a required lighting voltage of the flash discharge tube rises.

Thus, the present inventors presume that such variations in electrical characteristics accompanying the temperature rise are a main factor responsible for the occurrence of the damping phenomenon of output of the trigger signal.

The present inventors further presume that the occurrence of the variations in the electrical characteristics described above is caused by behavior of boron and sodium, i.e. an alkaline component, in the structure of the glass tube. The boron and sodium are contained in the borosilicate glass tube. That is, in the borosilicate glass which contains sodium, i.e. an alkaline component, the mobility of sodium ions in the structure of the glass tube becomes large with increasing temperature. On the other hand, the sodium ions also function as conduction carriers. Accordingly, the larger the mobility of the sodium ions, the larger the dielectric constant as well becomes. That is, it is presumed that variations in the relative dielectric constant and the like cause the variations in the electrical characteristics described above. In addition, alkaline components volatilize from the glass tube at high temperatures, adversely causing various adverse influences on emission of light. Note that the alkaline components described above are alkali metal components including sodium and potassium; this holds for the following descriptions.

Thus, for comparison, the present inventors checked to confirm what the damping phenomenon of output is in the case where a short-interval continuous-firing operation is performed in a flash discharge tube, the envelope of which is configured with a quartz tube made of quartz glass. This confirmation has shown that, although temperature of the quartz tube rises during the operation as in the case of the borosilicate glass tube, no damping phenomenon of output of the trigger signal occurs.

Quartz glass does not contain any alkaline component, notably sodium. That is, the quartz tube does not contain any sodium ion component which functions as a conduction carrier at high temperatures. Therefore, the quartz tube shows no great change, i.e. neither large increase nor large decrease in the dielectric constant and the like. From this, it can be presumed that, because the quartz tube does not consume the energy of the trigger signal, the damping phenomenon of output of the trigger signal does not occur. From the result of the comparison described above, the present inventors also presume that the alkaline components including sodium in the borosilicate glass are a main factor responsible for the damping phenomenon of output of the trigger signal.

Note that the flash discharge tube that employs the quartz tube (quartz glass) described above is mainly made of silicon dioxide. Quartz glass has a small thermal expansion coefficient, high heat resistance, high thermal shock resistance, and high mechanical strength. The flash discharge tube configured with the quartz tube is provided with electrode pins, i.e. the discharge electrodes, which are commonly made with tungsten, a refractory metal, as in the case of that configured with the borosilicate glass tube described above.

Unfortunately, the thermal expansion coefficient of the quartz tube is approximately $0.55 \times 10^{-6}$ K$^{-1}$, while the thermal expansion coefficient of tungsten ranges from $4.4 \times 10^{-6}$ K$^{-1}$ to $4.5 \times 10^{-6}$ K$^{-1}$. That is, the thermal expansion coefficient of the quartz tube is greatly different from that of tungsten. For this reason, when the quartz tube is fixed to tungsten by welding the tube directly to the tungsten to make hermetic sealing, such a difference between their thermal expansion coefficients causes a large strain in the quartz tube, resulting in occurrence of cracks and the like in the tube.

Thus, conventionally, various methods of preventing the occurrence of cracks and the like described above have been proposed or actually used; they will be described below.

For example, a flash discharge tube has been proposed which is provided with intermediate glass bodies, the thermal expansion coefficient of which sequentially varied in a direction of the tube axis of a quartz tube (see Patent Literature 1, for example). Each of the intermediate glass bodies is configured with a plurality of glass tubes, with the different glass tubes having different thermal expansion coefficients and being disposed in order of sequential degrees of the thermal expansion coefficients in the direction of the tube axis. This configuration makes it possible to join the quartz tube to tungsten, even though they have different thermal expansion coefficients.

Specifically, for the flash discharge tube according to Patent Literature 1, the intermediate glass bodies are prepared in advance, each of which has characteristics of a plurality of different thermal expansion coefficients. Then, one end-part glass tube of each of the intermediate glass bodies is first fixed to tungsten by welding the tube to the tungsten, with the one end-part glass tube being made of a borosilicate glass which has a thermal expansion coefficient approximating to that of the tungsten.

Next, the tungsten and the one end-part glass tube of the intermediate glass body are heated together to seal them hermetically.

In the same way, the quartz tube and the other end-part glass tube of the intermediate glass body are fixed to each other by welding, with the other end-part glass tube being made of silicon dioxide, as a chief component, which has a thermal expansion coefficient approximating to that of the quartz tube.

Next, the quartz tube and the other end-part glass tube of the intermediate glass body are heated together to seal them hermetically.

With this process, the quartz tube and the tungsten are hermetically sealed indirectly via the intermediate glass body, thereby configuring the flash discharge tube in which cracks and the like are difficult to occur.

Moreover, a flash discharge tube has been known which uses aluminosilicate glass, a glass for conventional use in molybdenum sealing, which is devoid of any alkaline component such as sodium (see Patent Literature 2, for example). As in the case of the quartz glass tube, aluminosilicate glass does not contain any alkaline component and the like which functions as a conduction carrier as temperature rises. For this reason, the glass is presumed not to have large variations in its dielectric constant and like.

Patent Literature 2 discloses a fluorescent lamp which includes: a tubular bulb made of a borosilicate glass having a thermal expansion coefficient ranging from about $5.0\times10^{-6}$ $K^{-1}$ to about $5.5\times10^{-6}$ $K^{-1}$; and electrode pins made of kovar having a thermal expansion coefficient ranging from about $4.0\times10^{-6}$ $K^{-1}$ to about $5.5\times10^{-6}$ $K^{-1}$. It is noted, however, that Patent Literature 2 offers no suggestion on the aforementioned damping phenomenon associated with a temperature rise of the borosilicate glass, and that constituent materials and the like described in the Literature are nothing more than a mere example. The Literature discloses exemplified constituent elements including: the electrode pins made of either tungsten or molybdenum, for example; and an envelope made of aluminosilicate glass, for example. In the context of the examples, the Literature suggests the need for taking linear expansion coefficients (thermal expansion coefficients) into consideration. In addition, the Literature also discloses a lamp using the flash discharge tube, and a lighting device using the lamp.

That is, as described above, the light-emitting device provided with a commonly-used flash discharge tube is subjected to a damping phenomenon of output of its trigger signal. Such a damping phenomenon is caused by a high temperature state resulting from a temperature rise due to accumulation of heat generated by the flash discharge tube during a firing operation, in particular a short-interval continuous-firing operation. Such a phenomenon is responsible for occurrence of problems, such as so-called misfires in which the flash discharge tube fails to fire.

For this reason, the number of firing times in the continuous-firing operation is restricted so as not to increase. Specifically, a firing-halt period after a predetermined number of firing times in the continuous-firing operation, for example, is forcibly introduced as needed, thereby controlling the firing operation.

Hence, the flash discharge tube disclosed in Patent Literature 1 includes the envelope configured with the quartz tube made of quartz glass which is devoid of any alkaline component. This configuration can prevent the occurrence of the damping phenomenon of output of the trigger signal, allowing a great increase in the number of firing times in the continuous-firing operation. Unfortunately, the flash discharge tube described above requires the configuration in which the quartz tube is provided with the intermediate glass bodies at both end parts of the tube, in view of the difference in thermal expansion coefficients between the electrode pins and the quartz tube that serves as the envelope. This in turn requires complicated processing steps for manufacturing the intermediate glass bodies, resulting in a great increase in costs of the flash discharge tubes and the light-emitting devices.

Moreover, Patent Literature 2 offers the suggestion that the envelope employ well-known aluminosilicate glass which is devoid of any alkaline component and known for use in molybdenum sealing. However, the offered suggestion is nothing more than a mere example, as described above. That is, Patent Literature 2 discloses the technology with which molybdenum electrodes are merely used as electrodes when aluminosilicate glass is used.

Then, as in the case of the quartz tube described in Patent Literature 1, the use of aluminosilicate glass prevents the occurrence of the damping phenomenon of output of the trigger signal, allowing a great increase in the number of firing times in the continuous-firing operation. Unfortunately, the melting point of molybdenum that configures the electrode pins is approximately 2600° C. Therefore, in cases of molybdenum being used as the electrodes of the flash discharge tube that utilizes an arc discharge phenomenon in which a large electric current is generated instantaneously, the use of molybdenum is disadvantageous in view of durability and the like in comparison with the use of tungsten having a melting point of approximately 3400° C.

CITATION LIST

Patent Literature

PTL 1: Japanese Patent No. 5262911
PTL 2: Japanese Patent Unexamined Publication No. H11-238489

SUMMARY OF THE INVENTION

The present invention is intended to provide a flash discharge tube which features excellent durability and a stable short-interval continuous-firing operation, and to provide a light-emitting device equipped with the flash discharge tube.

That is, the flash discharge tube according to the present invention includes: a light-transmitting envelope; a pair of discharge electrodes; a trigger circuit for outputting a trigger signal; and a trigger electrode disposed on the outer surface of the envelope. The trigger signal is applied to the trigger electrode. The pair of the discharge electrodes is configured with an anode and a cathode which are respectively hermetically sealed at both ends of the envelope, with xenon gas being sealed inside the envelope. The pair of the discharge electrodes includes tungsten pins which face each other and are disposed inside the envelope on a one-pin-for-one-electrode basis. Moreover, the envelope includes a central region, serving as an alkali-free region, which is configured with an alkali-free glass except for quartz glass. The central region becomes in a high temperature state during a firing operation of the flash discharge tube. The central region is smaller than a maximum region enclosing a gas-tight space formed by hermetically sealing the pair of the discharge electrodes, and is not smaller than a minimum region enclosing an arc-discharge space formed between the tungsten pins of the pair of the discharge electrodes. The alkali-free region contains either no alkali metal component or not larger than a predetermined amount of alkali metal components. Then, the trigger electrode is disposed in the alkali-free region.

In accordance with the configuration, large variations in electrical characteristics such as a relative dielectric constant can be reduced at the central region of the envelope. This, in turn, reduces energy consumption of the trigger signal at the central region of the envelope. As a result, this prevents the occurrence of a damping phenomenon of output of the trigger signal, thereby increasing the number of firing times in the short-interval continuous-firing operation.

Moreover, even when the envelope becomes in a high temperature state, via the tungsten pins facing each other, due to the short-interval continuous-firing operation, it is possible to prevent the tungsten pins from deteriorating. This further reduces the occurrence of misfires and the like attributed to the deterioration of the electrodes.

That is, first, the occurrence of damping in output of the trigger signal results in insufficient excitation of the xenon gas. When firing the flash discharge tube being in such a state, it requires forcibly-caused electrical breakdown inside a glass tube regardless of the insufficient excitation state of the xenon, which in turn requires emission of electrons pumped and stored at up to high potentials. At that time, when such electrons are emitted to make a discharge, the electrons collide with the anode and give it their increased collision energy, which causes the anode to tend to melt easily. On the other hand, the cathode is subjected to bombardment of xenon ions and alkaline component ions. The xenon ions are generated via collisions between the xenon gas and an increased number of electrons. The alkaline component ions are generated via collisions between alkaline components and the increased number of electrons. Such alkaline components come from a borosilicate glass via precipitation, volatilization, and decomposition attributed to high temperatures caused by the short-interval continuous-firing operation. For this reason, tips of discharge surfaces of the tungsten pins and edges of a discharge surface of a sintered electrode are presumed to melt. Moreover, if volatilized substances of alkaline components of the borosilicate glass adhere to the electrodes, the tip parts of the tungsten pins are locally oxidized, resulting in a reduction in their melting points. This causes the tungsten pins to tend to melt more easily.

Thus, by taking the configuration described above, it is possible to provide the flash discharge tube that features excellent durability and the increased number of firing times in the short-interval continuous-firing operation.

Moreover, the light-emitting device according to the present invention includes the flash discharge tube described above.

In accordance with the configuration, the light-emitting device uses the flash discharge tube, as a light source, which features excellent durability and the increased number of firing times in the short-interval continuous-firing operation. The configuration can provide the light-emitting device which features excellent durability to withstand arc discharge phenomena and excellent short-interval continuous-firing operation characteristics (repetitive-firing characteristics).

DESCRIPTION OF EMBODIMENTS

Hereinafter, descriptions will be made regarding flash discharge tubes according to embodiments of the present invention, with reference to FIG. 1.

Figure 1:
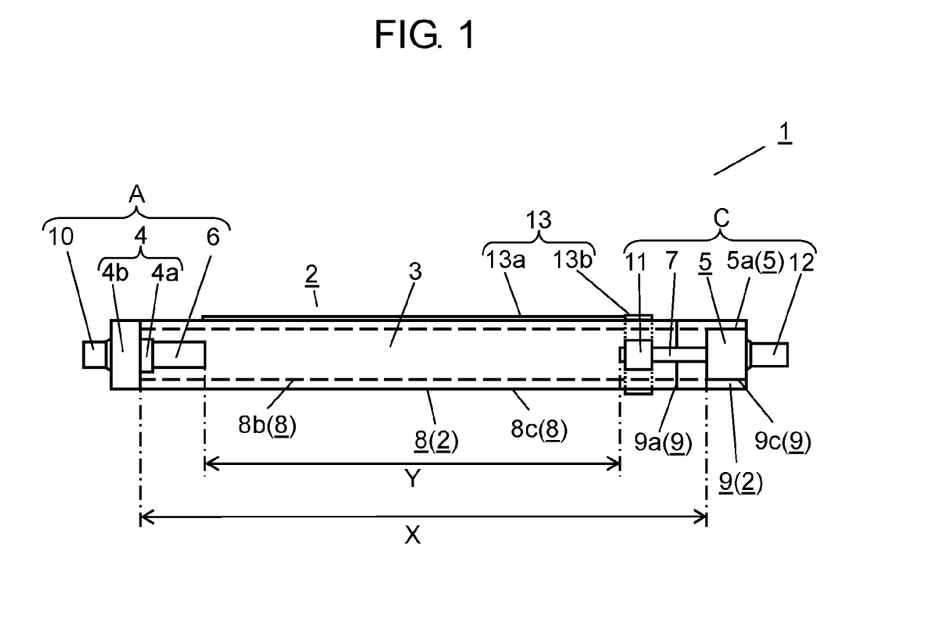
FIG. 1 is a schematic view of a flash discharge tube according to an embodiment of the present invention.

FIG. 1 is a schematic view of a flash discharge tube according to an embodiment of the invention.

As shown in FIG. 1, flash discharge tube 1 according to the embodiment includes: envelope 2; anode A; and cathode C. Anode A and cathode C are disposed at both sides of envelope 2 to configure a pair of discharge electrodes. The inside of envelope 2 is hermetically sealed via the pair of the discharge electrodes configured with anode A and cathode C, with xenon gas 3 being sealed in the inside.

Anode A includes: anode bead 4, tungsten pin 6 configuring an electrode pin, and external pin 10. Cathode C includes: cathode bead 5, tungsten pin 7 configuring an electrode pin, sintered electrode 11, and external pin 12. Xenon gas 3 is sealed in gas-tight space X in the inside of envelope 2 which is formed by hermetically sealing the pair of the discharge electrodes configured with anode A and cathode C.

Envelope 2 is configured with first envelope 8 and second envelope 9. First envelope 8 forms a space that includes arc-discharge space Y formed between tungsten pins 6 and 7 of the pair of the discharge electrodes configured with anode A and cathode C. Second envelope 9 is configured with a joint glass tube that is joined consecutively to at least one end of first envelope 8. Note that, in the embodiment, the figure illustrates the configuration by using the case where second envelope 9 is disposed only on the cathode C side.

First envelope 8 is configured with an aluminosilicate glass tube, for example, that is made of an alkali-free glass except for quartz glass. Such an alkali-free glass contains either no alkaline component or not larger than a predetermined amount of alkaline components (for example, the glass contains alkaline components as allowable impurities including not more than 0.1 wt % of alkali metal components). An example of such an aluminosilicate glass tube is Glass 8253 manufactured by SCHOTT AG, or the like. That is, first envelope 8 forms an alkali-free region.

Moreover, the joint glass tube of second envelope 9 is configured with a borosilicate glass tube which is designed containing alkaline components such that the softening point of the glass becomes low (e.g. ranging from about 700° C. to about 830° C.). Thus, an example of such a joint glass tube is Glass 8487 with a softening point of 775° C. manufactured by SCHOTT AG, or the like.

Note that the aluminosilicate glass tube itself is a well-known glass tube as described above. That is, the aluminosilicate glass tube contains almost no alkaline component. According to the specifications of Glass 8253 manufactured by SCHOTT AG, the specific component composition of the glass is configured containing: 16.5 wt % of aluminum oxide; 61.0 wt % of silicon dioxide; 13 wt % of calcium oxide and 8 wt % of barium oxide, both being alkaline earth metal oxides; less than 0.02 wt % of sodium oxide being an alkali metal oxide; and the like. Moreover, the specifications specify that Glass 8253 contains less than 0.03 wt %, even in total, of alkali metal oxides.

In addition, Glass 8253 has the characteristics as follows: That is, it has a softening point of approximately 1000° C. and a thermal expansion coefficient of $4.7 \times 10^{-6}$ $K^{-1}$. That is, the softening point of Glass 8253 is higher than that ranging approximately from 700° C. to 830° C. of the borosilicate glass that contains alkaline components. Moreover, the thermal expansion coefficient of Glass 8253 is larger than that ranging from $3.2 \times 10^{-6}$ $K^{-1}$ to $4.1 \times 10^{-6}$ $K^{-1}$ of the borosilicate glass and that of $0.55 \times 10^{-6}$ $K^{-1}$ of the quartz glass.

Anode A is configured with tungsten pin 6 to which anode bead 4 is fixed by welding, and external pin 10 which is welded to tungsten pin 6. Note that tungsten pin 6 has excellent characteristics, such as a thermal expansion coefficient ranging from $4.4 \times 10^{-6}$ $K^{-1}$ to $4.5 \times 10^{-6}$ $K^{-1}$ and a melting point of approximately 3400° C. Anode bead 4 is configured with a well-known borosilicate glass, such as Glass 8487 manufactured by SCHOTT AG, for example. External pin 10 is made of a metal, having a melting point of about 1455° C., including: pure nickel, and a nickel-based metal such as an iron-nickel metal or a manganese-nickel metal. The external pin configures an external connection terminal. Note that external pin 10 is disposed on the outside of the glass tube, without being sealed and fixed to the glass of the flash discharge tube; therefore, the pin has no need to be matched with the glass in terms of thermal expansion coefficient.

Moreover, anode bead 4 is configured with first anode bead 4a and second anode bead 4b. First anode bead 4a is disposed, being fixed directly to tungsten pin 6 by welding. Second anode bead 4b is disposed, being fixed to the outer side of first anode bead 4a by welding. In this configuration, the outer diameter of end surface 4bb (see FIG. 5) of second anode bead 4b is configured to be either equal or approximately equal to the outer diameter of first envelope 8 that is configured with the aluminosilicate glass tube. Then, as will be described later, the anode bead is melted and joined, via end surface 4bb, to a wall-thickness part of end surface 8a (see FIG. 5) of first envelope 8. This allows the formation of hermetic sealing indirectly between first envelope 8 and tungsten pin 6.

Figure 5:
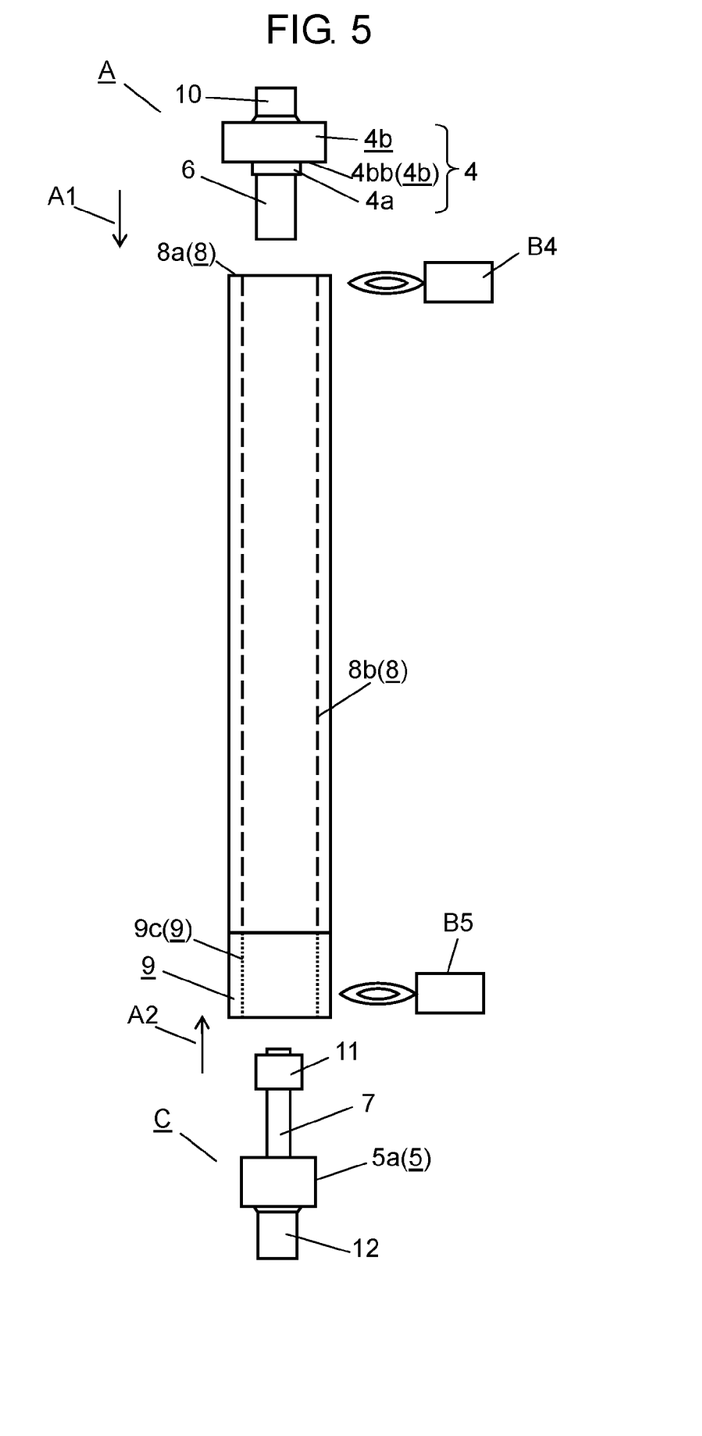
FIG. 5 is a schematic view illustrating an example of steps of manufacturing the flash discharge tube according to the embodiment.

That is, anode bead 4 has a double structure as follows: Firstly, second anode bead 4b is sealed with end surface 8a of the aluminosilicate glass tube, resulting in an increased reliability of the sealing. Secondary, the first anode bead which matches, in size, the aluminosilicate glass tube is disposed such that the first anode bead can be fit into the tube. This allows easy alignment of anode A with the center axis of the aluminosilicate glass tube, which is because the double structure is employed. More specifically, in cases where the glasses having different thermal coefficients are joined, the joining in the tube axis direction is advantageous in increasing the reliability of hermetic sealing between them. For this reason, end surface 8a of first envelope 8 and end surface 4bb of second anode bead 4b are joined intentionally in the tube axis direction. Incidentally, in cases of conventional joining between dissimilar glasses, in which the side surface of a bead is joined to the inner surface of a glass tube, a strain-induced stress is generated in the circumferential direction, which tends to cause the bead to be detached from the tungsten in the direction. For this reason, unlike such a conventional joining, the end surface of anode bead 4 is joined to the end surface of the aluminosilicate glass tube, in the tube axis direction. This configuration prevents anode bead 4 from being detached from tungsten pin 6. Note that it is also possible to configure the anode bead with one bead, with the end surface of the bead being hermetically sealed with the end surface of the glass tube. Nevertheless, in the embodiment, first anode bead 4a is disposed along the circumferential direction to configure anode bead 4 in the double structure, which brings about ease of alignment of tungsten pin 6 with the center of the tube axis direction during the sealing process of the pin.

Cathode C is configured with cathode bead 5, tungsten pin 7, sintered electrode 11, and external pin 12, as described above. Tungsten pin 7 is disposed with the pin being hermetically sealed with cathode bead 5. Sintered electrode 11 is fastened by swaging, for example, on the tip side (the side facing anode A) of tungsten pin 7. External pin 12 is welded to tungsten pin 7 to configure a connection terminal to the outside. Note that, likewise anode A, cathode bead 5, tungsten pin 7, and external pin 12 which configure cathode C are made of a borosilicate glass, tungsten, a nickel-based metal, respectively. In this configuration, side surface part 5a of cathode bead 5 has an outer diameter which approximately equals the inner diameter of second envelope 9. Then, as will be described later, the cathode bead is melted and joined, via side surface part 5a, to inner peripheral surface 9c of second envelope 9. This allows the formation of hermetic sealing indirectly between second envelope 9 and tungsten pin 7.

Moreover, first envelope 8 described above includes: transparent conductive film 13a, and trigger electrode 13. Transparent conductive film 13a is formed in a region on the external surface of first envelope 8, with the region excluding end part areas of the first envelope, for example. Such a region covers an about half circumference of the envelope and extends along the longitudinal direction of at least arc-discharge space Y, for example. Trigger electrode 13 is configured with trigger band 13b, for example, which is formed as follows: That is, a metal conductive-wire is wound on one end part (e.g. an end part on the cathode C side) of transparent conductive film 13a, and then the wound wire is fixed with conductive paint.

In this way, flash discharge tube 1 according to the embodiment is configured.

Hereinafter, descriptions will be made regarding one example of a method of manufacturing flash discharge tube 1 according to the embodiment of the present invention, with reference to FIGS. 2A to 5.

Figure 2A:
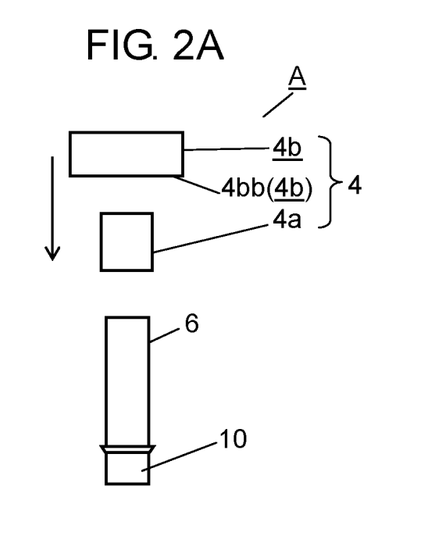
FIG. 2A is a schematic view illustrating an example of steps of manufacturing an anode of the flash discharge tube according to the embodiment.
Figure 2B:
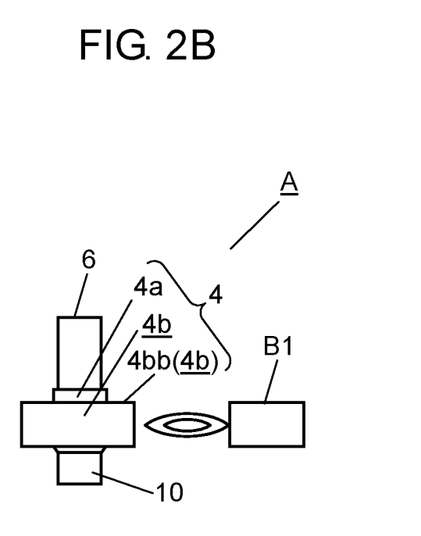
FIG. 2B is a schematic view illustrating the example of the steps of manufacturing the anode of the flash discharge tube according to the embodiment.
Figure 3A:
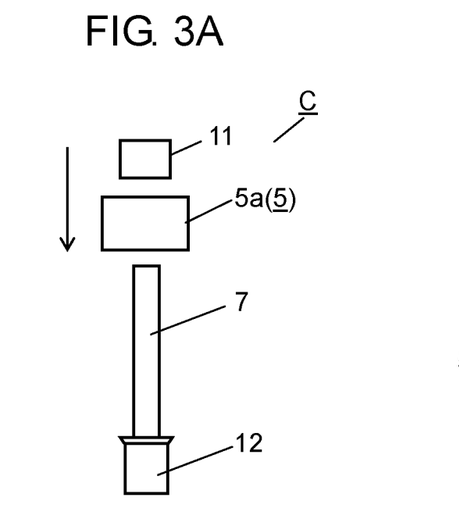
FIG. 3A is a schematic view illustrating an example of steps of manufacturing a cathode of the flash discharge tube according to the embodiment.
Figure 3B:
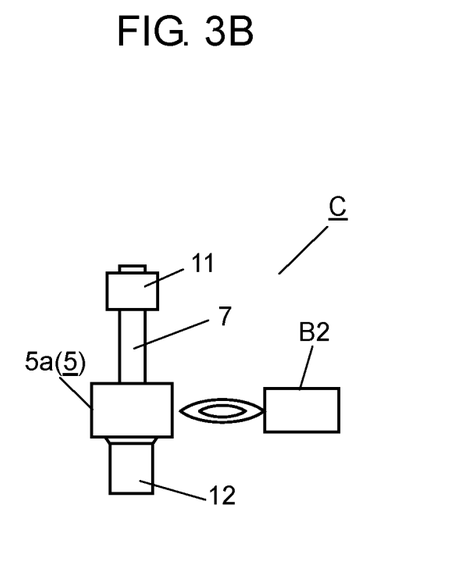
FIG. 3B is a schematic view illustrating the example of the steps of manufacturing the cathode of the flash discharge tube according to the embodiment.
Figure 4A:
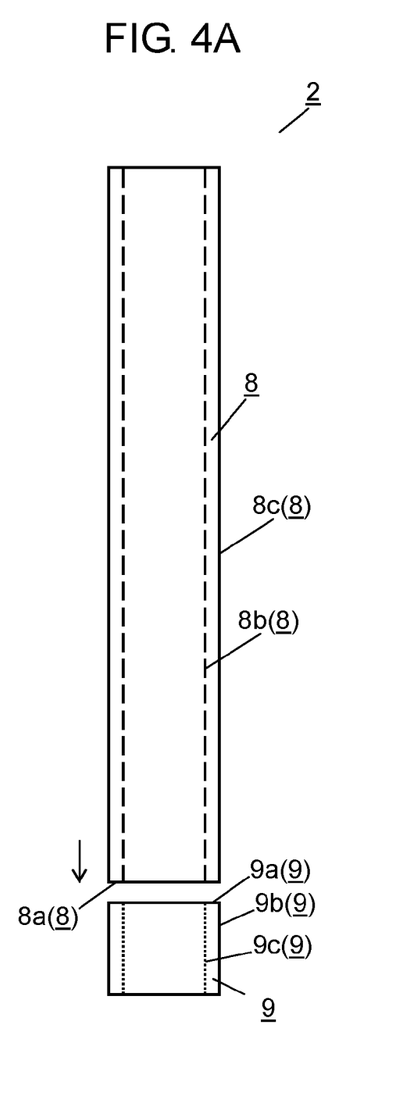
FIG. 4A is a schematic view illustrating an example of steps of manufacturing an envelope of the flash discharge tube according to the embodiment.
Figure 4B:
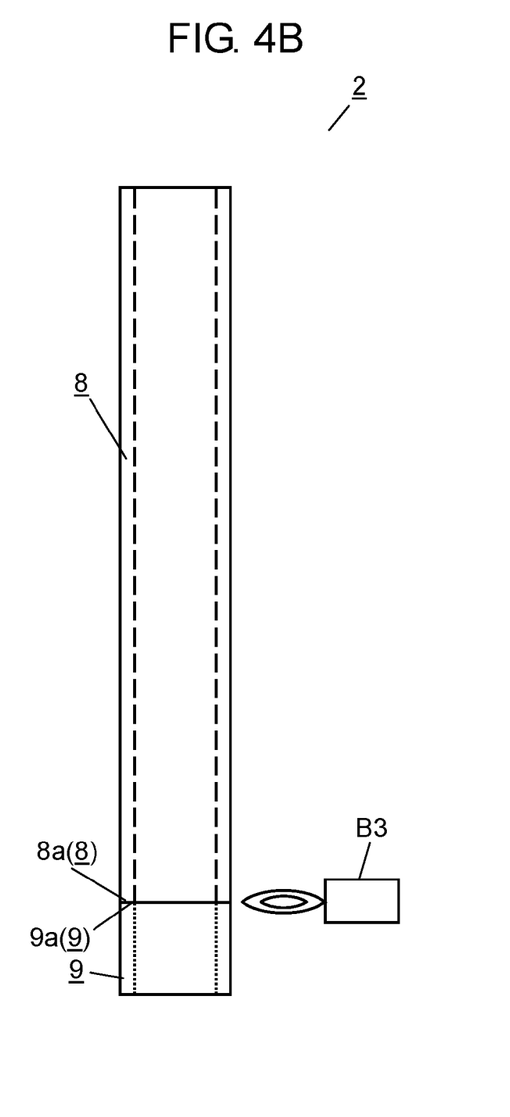
FIG. 4B is a schematic view illustrating the example of the steps of manufacturing the envelope of the flash discharge tube according to the embodiment.

FIGS. 2A and 2B are schematic views illustrating an example of steps of manufacturing anode A. FIGS. 3A and 3B are schematic views illustrating an example of steps of manufacturing cathode C. FIGS. 4A and 4B are schematic views illustrating an example of steps of manufacturing envelope 2. FIG. 5 is a schematic view illustrating an example of steps of manufacturing the flash discharge tube according to the embodiment, by using anode A and cathode C that have been manufactured in the steps illustrated in FIGS. 2A to 4B.

As shown in FIG. 2A, manufacturing of anode A is started by welding external pin 10 made of a nickel-based metal to tungsten pin 6 having a thermal expansion coefficient of $4.4 \times 10^{-6}$ K$^{-1}$ to $4.5 \times 10^{-6}$ K$^{-1}$. In this configuration, as shown in FIG. 2A, a step-height part is preferably disposed on a welding surface of external pin 10, for example, with the step-height part being larger in size than the inner diameter of second anode bead 4b. This configuration brings about ease of positioning of anode bead 4 in anode A.

Next, anode bead 4 (first anode bead 4a and second anode bead 4b) is moved downward (in the direction indicated by the arrow), for example, to cause tungsten pin 6 to be inserted into the anode bead which is made of the borosilicate glass having a thermal expansion coefficient of $3.2 \times 10^{-6}$ K$^{-1}$ to $4.1 \times 10^{-6}$ K$^{-1}$ and is formed in a hollow cylindrical shape. After that, as shown in FIG. 2B, tungsten pin 6 and anode bead 4 are heated together by using burner B1 to melt and join the bead to the pin. This completes anode A.

Likewise, as shown in FIG. 3A, manufacturing of cathode C is started by welding external pin 12 made of a nickel-based metal to tungsten pin 7 having a thermal expansion coefficient of $4.4 \times 10^{-6}$ K$^{-1}$ to $4.5 \times 10^{-6}$ K$^{-1}$. As shown in FIG. 3A, a step-height part is preferably disposed on the welding surface of external pin 12, for example, with the step-height part being larger in size than the inner diameter of cathode bead 5. This configuration brings about ease of positioning of cathode bead 5 in cathode C.

Next, cathode bead 5 is moved downward (in the direction indicated by the arrow), for example, to cause tungsten pin 7 to be inserted into the cathode bead which is made of the borosilicate glass having a thermal expansion coefficient of $3.2 \times 10^{-6}$ K$^{-1}$ to $4.1 \times 10^{-6}$ K$^{-1}$ and is formed in a hollow cylindrical shape. After that, as shown in FIG. 3B, tungsten pin 7 and cathode bead 5 are heated together by using burner B2 to melt and join the bead to the pin.

Moreover, sintered electrode 11 is fastened to a near-tip part of tungsten pin 7 by swaging, for example, with the sintered electrode having been formed by sintering powder of a refractory metal such as tantalum, niobium, zirconium, or nickel, for example. This completes cathode C.

In this configuration, the difference in thermal expansion coefficients is small between tungsten pin 6 and anode bead 4 that configure anode A; the difference in thermal expansion coefficients is small between tungsten pin 7 and cathode bead 5 that configure cathode C. Specifically, these differences are each set to be not larger than $1 \times 10^{-6}$ K$^{-1}$. This configuration prevents the occurrence of problems which are due to the differences in thermal expansion coefficients when they are melted and joined by heating.

Next, as shown in FIG. 4A, first envelope 8 configured with the aluminosilicate glass tube is moved downward (in the direction indicated by the arrow) in the Figure, for example, such that end surface 8a of first envelope 8 comes in contact with the end surface 9a of second envelope 9 configured with the borosilicate glass tube containing the alkaline components, with the inner and outer diameters of the first envelope being either equal or approximately equal to those of the second envelope, respectively. Then, as shown in FIG. 4B for example, these envelopes are heated together by using burner B3 to be melted and joined to each other, with end surface 8a being in contact with end surface 9a. This completes envelope 2.

In this configuration, the difference between the thermal expansion coefficient ($4.6 \times 10^{-6}$ K$^{-1}$) of the aluminosilicate glass tube configuring first envelope 8 and that ($3.2 \times 10^{-6}$ K$^{-1}$ to $4.1 \times 10^{-6}$ K$^{-1}$) of the borosilicate glass tube configuring second envelope 9, is about $1 \times 10^{-6}$ K$^{-1}$ or so. Therefore, if outer peripheral surface 9b of second envelope 9 is inserted into inner peripheral surface 8b of first envelope 8 and then both the surfaces are melted and joined in the radial direction, problems such as a crack are likely to occur due to the difference between their thermal expansion coefficients.

Hence, in the embodiment, these envelopes are melted and joined in the tube axis direction, via both the thickness (wall-thickness) part of end surface 8a of first envelope 8 and the thickness (wall-thickness) part of end surface 9a of second envelope 9. This configuration can greatly reduce the occurrence of the problems due to the difference between their thermal expansion coefficients.

Next, as shown in FIG. 1, trigger electrode 13 is formed in a predetermined region on outer peripheral surface 8c of first envelope 8 of envelope 2, with the trigger electrode being configured with transparent conductive film 13a made of tin oxide or the like, for example. Transparent conductive film 13a is formed by a well-known method including vapor deposition, for example. To trigger electrode 13, a trigger voltage is applied to excite the xenon gas sealed in the inside. Note that, specifically, the predetermined region on outer peripheral surface 8c of first envelope 8 is an area which excludes the first-envelope's end part area in contact with the borosilicate glass that configures second envelope 9.

Next, as shown in FIG. 5, anode A, cathode C, and the like having been manufactured by the method shown in FIGS. 2A to 4B are assembled together with envelope 2 in the following manner.

Specifically, anode A is first moved downward in the direction indicated by arrow A1 in the Figure. Thus, end surface 4bb of second anode bead 4b of anode bead 4 of anode A is caused to come in contact with end surface 8a of first envelope 8 of envelope 2. After that, their contacting portion is heated by using burner B4, for example. With this process, end surface 4bb of second anode bead 4b and end surface 8a of first envelope 8 are melted and joined to each other. As a result of this, anode A is hermetically sealed with envelope 2 via first envelope 8.

Next, cathode C is moved upward in the direction indicated by arrow A2 in the Figure. Then, side surface part 5a of cathode bead 5 of cathode C is inserted into the inside of envelope 2, along inner peripheral surface 9c of second envelope 9 of the envelope 2.

Then, while a desired amount of xenon gas 3 (see FIG. 1) is being fed into the inside of envelope 2, second envelope 9 is heated by using burner B5, for example, with the cathode having been inserted into the inside. With this process, side surface part 5a of cathode bead 5 of cathode C and inner peripheral surface 9c of second envelope 9 are melted and joined to each other. As a result, cathode C is hermetically sealed with envelope 2 (second envelope 9).

Next, although not particularly shown in the Figure, other steps are performed which includes steps of setting external pin 10 of anode A to be a desired length, setting external pin 12 of cathode C to be a desired length, and pre-soldering external pins 10 and 12.

In addition, as shown in FIG. 1, steps are performed as needed which include a step of forming trigger band 13b at the end part on the cathode C side of transparent conductive film 13a that has been formed on first envelope 8. Such a trigger band together with transparent conductive film 13a configures the trigger electrode to which the trigger voltage is applied.

By the steps described above, flash discharge tube 1 according to the embodiment is formed, as shown in FIG. 1.

As described above, the flash discharge tube according to the embodiment is configured without using any intermediate glass body, step-connection glass tube, or the like which requires complicated processing steps. In other words, the manufacturing steps of flash discharge tube 1 can be simplified, which allows flash discharge tubes 1 to sell at low prices.

Hereinafter, descriptions will be made regarding a temperature distribution of flash discharge tube 1 according to the embodiment when the tube is subjected to a short-interval continuous-firing operation, with reference to FIG. 6.

Figure 6:
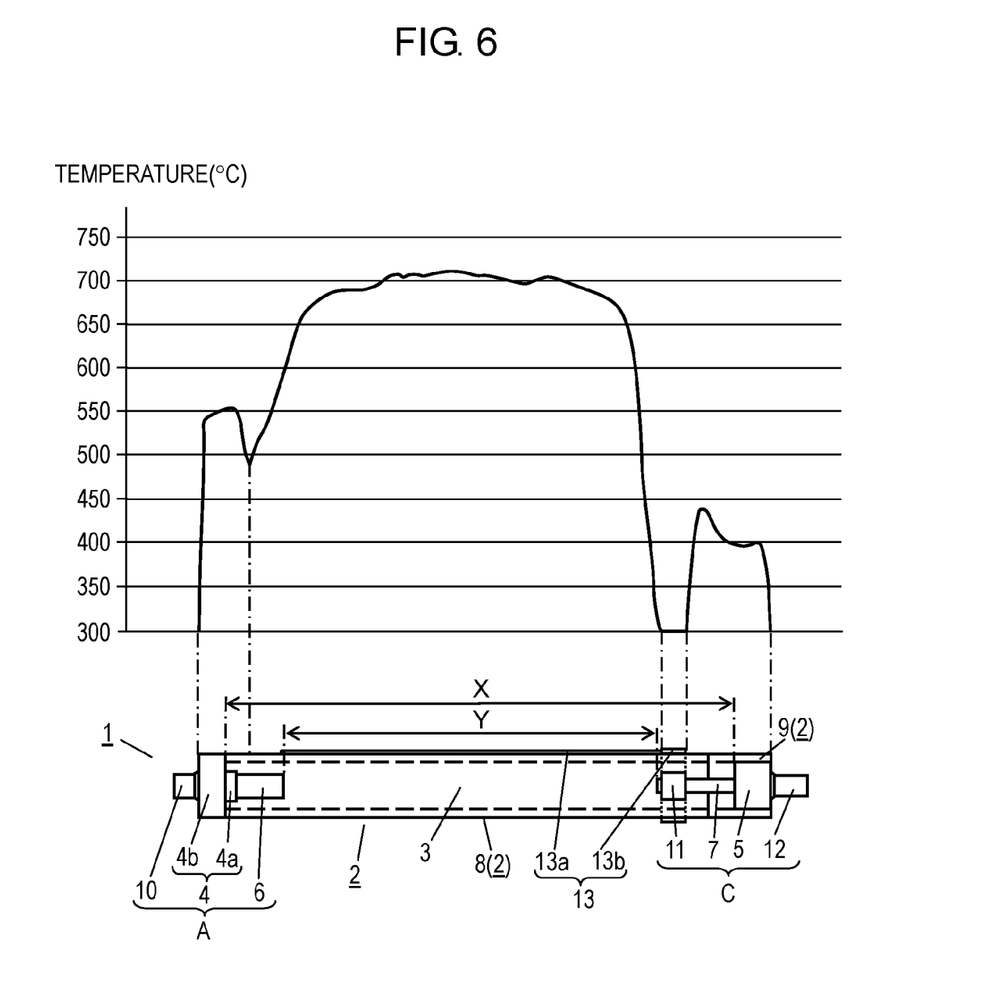
FIG. 6 is a schematic graph of a temperature distribution, in a longitudinal direction, of the flash discharge tube according to the embodiment when the tube is subject to a short-interval continuous-firing operation.

FIG. 6 is a schematic graph of the temperature distribution, in a longitudinal direction, of the flash discharge tube according to the embodiment when the tube is subject to the short-interval continuous-firing operation.

Note that the temperature distribution shown in FIG. 6 was obtained by measurement under continuous-firing operation conditions in which a firing operation lasting for e.g. a few milliseconds was repeated 250 times at 0.8 s intervals.

That is, FIG. 6 shows the schematic graph of the temperature distribution in the tube axis (longitudinal) direction when the flash discharge tube configured as described above is fired 250 times continuously at 0.8 s intervals.

From FIG. 6, it can be seen that the maximum reaching temperature of the flash discharge tube is so high that the tube becomes high temperatures exceeding 700° C.

It can also be seen that, in arc-discharge space Y where arc discharges occur between the pair of the discharge electrodes, the temperature distribution in the tube axis direction is held uniform at high temperatures of about 700° C. or so.

Moreover, it can be seen that, in the proximity of each of the so-called sealing parts which include anode bead 4 of anode A and cathode bead 5 of cathode C, the corresponding temperature distribution is lower than that in arc-discharge space Y but is still at high temperatures from approximately 400° C. to approximately 550° C. The distribution also shows that the temperature in the proximity of the sealing part on the anode A side is higher than that in the proximity of the sealing part on the cathode C side.

Note that, in the embodiment, tungsten pin 6 is configured to have a relatively long length, with the pin configuring anode A in gas-tight space X in which xenon gas is sealed.

For this reason, it can be seen that a temperature-dip region occurs near a center-of-length portion of tungsten pin 6.

Note that such a temperature-dip region occurs due to the presence of a spatial distance between the tungsten pin heated by discharges and the inner diameter of the glass tube. That is, a heat-conduction in the portion corresponding to the temperature-dip region is as follows: Heat of tungsten pin heated by discharges is conducted from the pin, through the xenon gas, the inner surface of the glass tube, and the glass tube, to the outer surface of the glass tube. In contrast, a heat-conduction to the sealing face between anode bead 4 and the glass tube is as follows: Heat of tungsten pin is conducted, through anode bead 4, to the sealing part of the glass tube. Such a difference between the heat-conductions is responsible for the temperature-dip region.

Moreover, it can be seen that, in the proximity of cathode C as well, another temperature-dip region occurs in the formation region of trigger band 13b. This results from the configuration as follows: A trigger wire or the like is wound on the outer surface of the glass tube, on the cathode C side, where sintered electrode 11 is disposed inside the glass tube; the wound wire is then fastened with silver paint. This configuration allows heat to dissipate in the air via the trigger wire and the like, resulting in the formation of the region of further lower temperatures.

Incidentally, in cases of the envelopes of conventional flash discharge tubes, in each of which a borosilicate glass containing an alkaline component is used to configure the region that is subjected to high temperatures not lower than 400° C. caused by arc discharges, a damping phenomenon of the trigger signal is considered to occur due to the alkaline component in the borosilicate glass, as described above. That is, when the trigger signal is supplied to the region formed with the borosilicate glass, energy consumption of the trigger signal occurs at the glass tube made of the borosilicate glass. This results in the damping of the output of the trigger signal, which possibly causes misfires.

Fortunately, the flash discharge tube according to the embodiment is configured as follows: Of the region becoming in the high temperature state, a region is defined as the alkali-free region, which encloses both the arc-discharge space Y and parts of gas-tight space X filled with the sealed xenon gas. Such a region is formed by first envelope 8 configured with the aluminosilicate glass tube. Moreover, trigger electrode 13 is formed on first envelope 8 (the alkali-free region). This configuration prevents the energy of the trigger signal from being consumed at first envelope 8 due to the alkaline component.

That is, in the embodiment, the hermetic sealing between the aluminosilicate glass tube configuring the envelope and the tungsten pin serving as the corresponding discharge electrode, is formed via the joint glass tube made of the borosilicate glass. The borosilicate glass is a glass for sealing, having a thermal expansion coefficient which matches that of tungsten. In this configuration, if the trigger electrode is formed on the borosilicate glass to which the trigger signal is applied as in the case of conventional configurations, the energy consumption occurs in the region of the borosilicate glass when it is at high temperatures. Hence, in the embodiment, the trigger electrode is formed not in the region of the borosilicate glass but in the alkali-free region. That is, the configuration is made such that the trigger signal is supplied not to the region of the borosilicate glass. This reduces the damping of output of the trigger signal, thereby preventing misfires and the like. The advantageous effect described above can be confirmed from the temperature distribution, shown in FIG. 6, which results from the short-interval continuous-firing operation. From this confirmation, it can be seen that both the alkali-free region and the region of the trigger electrode are required to be aligned with the area which becomes high temperatures due to firings.

It is noted, however, that the embodiment is not limited to the aforementioned descriptions, i.e. the exemplary embodiments described above.

For example, it goes without saying that the methods of hermetically sealing anode A, sealing the xenon gas, and the like can be changed in various ways, as described below, for example.

That is, in the embodiment, although the descriptions have been made using the example in which second envelope 9 is melted and joined only to the one end of first envelope 8, the configuration is not limited to this. For example, second envelope 9 may be melted and joined to each of both ends of first envelope 8. Then, anode A may be melted and joined via second envelope 9. This configuration requires that the outer diameter of anode bead 4 of anode A be formed to be smaller than the inner diameter of second envelope 9, as in the case of cathode bead 5. With this configuration, the outer peripheral surface of anode bead 4 can be melted and joined to inner peripheral surface 9c of corresponding second envelope 9. As a result, the advantageous effects described above can be achieved.

Moreover, in the embodiment, although the descriptions have been made using the example in which envelope 2 is configured with first envelope 8 and second envelope 9, the configuration is not limited to this. For example, envelope 2 may be configured only with first envelope 8. In this configuration, the outer diameters of anode bead 4 of anode A and cathode bead 5 of cathode C are each formed to be smaller than the inner diameter of first envelope 8. Moreover, first envelope 8 is formed such that the envelope is lengthened in the tube axis direction by a length not smaller than two times the envelope's inner diameter, for example. Then, the side surface part of each of anode bead 4 and cathode bead 5 is preferably inserted into the inside along the corresponding inner peripheral surface of first envelope 8, and then melted and joined to the envelope. This can achieve the same advantageous effects.

Furthermore, in the embodiment, although the descriptions have been made using the example in which anode bead 4 is configured with first anode bead 4a and second anode bead 4b, the configuration is not limited to this. For example, anode bead 4 may be configured only with second anode bead 4b that is melted and joined directly to tungsten pin 6. This can achieve the same advantageous effects with such a simplified configuration.

In addition, in the embodiment, although the descriptions have been made using the example in which cathode C is hermetically sealed by using burner B5 while xenon gas 3 is being fed into the inside of envelope 2, the configuration is not limited to this. For example, a carbon heater may be used to make the hermetic sealing. In this case, specifically, cathode C, envelope 2 with anode A having been sealed, and the carbon heater are placed altogether in the inside of a vacuum chamber, that is, the members shown in FIG. 5 excluding burner B5 are placed there. The chamber has a work space which allows xenon gas to be fed into the envelope at a predetermined pressure. Then, in the inside of the vacuum chamber, cathode bead 5 of cathode C and second envelope 9 of envelope 2 are melted and joined to each other by using the carbon heater and the envelope is filled with the xenon gas.

Moreover, a well-known hermetic sealing process may be used as follows: For example, an exhaust tube is disposed and connected to envelope 2. The inside of envelope 2 is exhausted and then charged with xenon gas, via the exhaust tube. After that, the exhaust tube is tipped off. In this case, envelope 2 is configured only with first envelope 8, without being joined to second envelope 9 serving as a joint glass tube. Furthermore, cathode C is configured such that cathode bead 5 has the same configuration as that of anode bead 4, which holds for the outer diameters of the end portions of both the beads. With this configuration, as in the case of anode A, cathode bead 5 is preferably melted and joined directly to the corresponding one end of end surface 8a, via their thicknesses.

Furthermore, in the embodiment, although the descriptions have been made using the example in which trigger electrode 13 is configured with transparent conductive film 13a and trigger band 13b, the configuration is not limited to this. For example, trigger electrode 13 may be configured only with a transparent conductive film 13a or, alternatively, configured with transparent conductive film 13a and a metal wire wound on first envelope 8.

In addition, in the embodiment, although the descriptions have been made using the example in which the alkali-free region is formed in the area of first envelope 8, the configuration is not limited to this. For example, the alkali-free region may be formed to cover an entire area that becomes high temperatures due to firing operations. This can achieve the same advantageous effects independently of sealing methods. Nevertheless, the alkali-free region is preferably formed as described below, in the case like the embodiment where tungsten pins 6 and 7 are hermetically sealed with the aluminosilicate glass tube of the first envelope via anode bead 4 and cathode bead 5, respectively, with both beads being made of the borosilicate glass. That is, the alkali-free region is formed so as to keep out of the envelope's areas to which the borosilicate glass is melted and joined because the electrical characteristics of the borosilicate glass vary with increasing temperature.

Specifically, first, let a maximum region be gas-tight space X in which xenon gas is sealed. Such gas-tight space X is a space that includes anode bead 4 and cathode bead 5 and excludes the so-called sealing parts. On the other hand, let a minimum region be a region enclosing arc-discharge space Y which is a space between the tips of tungsten pins 6 and 7, i.e. the pair of the electrodes. Such a minimum region is defined in view of the fact that the trigger signal should be applied to a part including surrounding areas of the discharge electrodes. Then, the alkali-free region is formed in a central region that is not smaller than the minimum region and smaller than the maximum region; such a central region will become high temperatures. Thus, in the embodiment, the alkali-free region shown in FIG. 1 is defined as a region that encloses both arc-discharge space Y formed between the pair of the discharge electrodes described above and the parts of gas-tight space X with each of the parts being joined consecutively to arc-discharge space Y.

In this way, flash discharge tube 1 according to the embodiment is completed.

Hereinafter, descriptions will be made regarding an example of a light-emitting device according to the embodiment of the present invention, with reference to FIG. 7.

Figure 7:
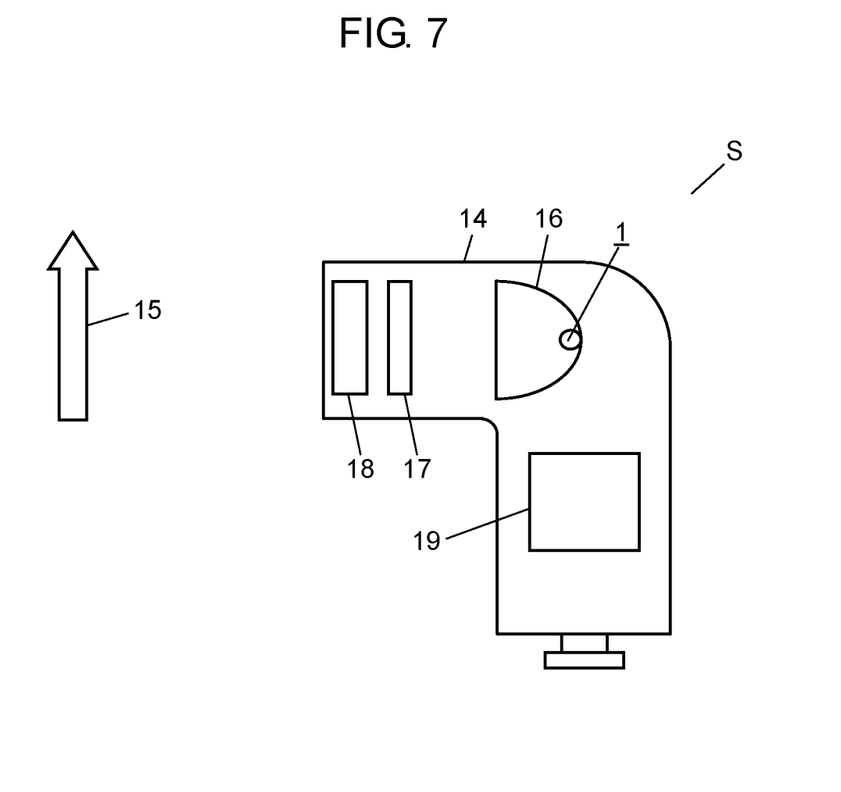
FIG. 7 is a schematic view of a configuration of a stroboscopic device, an example of a light-emitting device using the flash discharge tube according to the embodiment of the present invention.

FIG. 7 is a schematic view of a configuration of stroboscopic device S, an example of the light-emitting device equipped with flash discharge tube 1 according to the embodiment of the invention.

As shown in FIG. 7, stroboscopic device S, i.e. an example of the light-emitting device according to the embodiment, is configured including body 14. In the inside of body 14, stroboscopic device S further includes: flash discharge tube 1 described above, reflector 16, optical member 17, optical controller 18, and firing operation controller 19. Flash discharge tube 1 serves as a light source to illuminate subject 15 and like. Reflector 16 guides light emitted from flash discharge tube 1 in a direction toward subject 15. Optical member 17 is disposed between flash discharge tube 1 and subject 15 so as to intercept light in a short wavelength region, e.g. light having wavelengths not longer than 400 nm. Optical controller 18 controls light incident via optical member 17, regarding its outgoing direction, outgoing angle, etc. Firing operation controller 19 controls the firing operation of flash discharge tube 1.

When flash discharge tube 1 performs the firing operation, stroboscopic device S, being controlled by firing operation controller 19, operates in the following manner.

First, the light emitted from flash discharge tube 1 reaches optical member 17 directly and indirectly via reflection with reflector 16. Of the light having reached there, light in the shorter wavelength region is intercepted by optical member 17. Accordingly, the light devoid of the light having wavelengths not longer than 400 nm, for example, goes out of optical member 17. The outgoing light is controlled by optical controller 18 regarding an irradiation angle and the like, for example, and is then applied to subject 15.

In this configuration, stroboscopic device S according to the embodiment includes flash discharge tube 1 according to the embodiment, as a light source. Specifically, flash discharge tube 1 is configured such that the tungsten pins are used as its electrode pins and that the aluminosilicate glass except for quartz glass is used for its envelope in the appropriate region where the envelope will become high temperatures due to the short-interval continuous-firing operation. With this configuration, flash discharge tube 1 having the cheap configuration can reduce the damping of output of the trigger signal, thereby reducing the occurrence of misfires, for example. That is, the stroboscopic device uses flash discharge tube 1 that features the ability to perform stable short-interval continuous-firing operations, with low cost and excellent durability. As a result, stroboscopic device S can be implemented which features greatly improved characteristics of firing-life durability and short-interval repetitive-firing durability.

Note that, although the light-emitting device according to the embodiment has been described using the case of stroboscopic device S, the configuration is not limited to this. For example, the flash discharge tube described above may be used as light sources for various types of light-emitting devices including: aviation obstacle lights installed at high elevations of such as bridges and tall buildings; and warning lights mounted on aircraft, emergency vehicles such as patrol cars, etc.

As described above, the flash discharge tube according to the present invention includes: the light-transmitting envelope; the pair of the discharge electrodes configured with the anode and the cathode; the trigger circuit to output the trigger signal; and the trigger electrode formed on the outer surface of the envelope, with the trigger signal being inputted to the trigger electrode. Each of the anode and cathode is hermetically sealed and disposed at the corresponding one of both ends of the envelope, with the inside of the envelope being filled with xenon gas. The pair of the discharge electrodes includes the tungsten pins, on a one-pin-for-one-electrode basis, that are disposed inside the envelope to face each other. Moreover, the envelope includes the alkali-free region in the central region that becomes high temperatures during firing operations. Such a central region is smaller than the maximum region that encloses the gas-tight space formed by the hermetic sealing of the pair of the discharge electrodes and is not smaller than the minimum region that encloses the arc-discharge space formed between the tungsten pins of the pair of the discharge electrodes. Such an alkali-free region is configured with the alkali-free glass except for quartz glass, with the alkali-free glass containing either no alkali metal component or not larger than a predetermined amount of alkali metal components. Then, the trigger electrode may be disposed in the alkali-free region.

In accordance with the configuration, large variations in electrical characteristics such as the relative dielectric constant can be reduced at the central region of the envelope.

This, in turn, reduces energy consumption of the trigger signal at the central region of the envelope. As a result, this prevents the occurrence of the damping phenomenon of output of the trigger signal, thereby increasing the number of firing times in the short-interval continuous-firing operation.

Moreover, even when the envelope becomes in a high temperature state, via the tungsten pins facing each other, due to the short-interval continuous-firing operation, it is possible to prevent the tungsten pins from deteriorating. This allows a further reduction in the occurrence of misfires and the like attributed to the deterioration of the electrodes.

That is, the configuration described above can provide the flash discharge tube that features excellent durability and the increased number of firing times in the short-interval continuous-firing operation.

Moreover, the envelope of the flash discharge tube according to the present invention includes: the alkali-free glass tube made of the alkali-free glass except for quartz glass, and the joint glass tube made of the borosilicate glass. The alkali-free glass tube forms the arc-discharge space as the alkali-free region, with the arc-discharge space enclosing at least an arc-discharge region. The joint glass tube has the inner and outer diameters which are either equal or approximately equal to those of the alkali-free glass tube, and is melted and joined to the end surface of one end of the alkali-free glass tube. Moreover, the flash discharge tube is configured including the trigger electrode and the anode bead. The trigger electrode is formed on the outer surface of the alkali-free glass tube, with the outer surface excluding both end parts of the alkali-free glass tube. The anode bead is made of the borosilicate glass, and hermetically seals one of the discharge electrodes such that the anode bead has the end surface part having the outer diameter of which is approximately equal to that of the alkali-free glass tube. The one of the discharge electrodes includes a corresponding one of the tungsten pins, with the corresponding tungsten pin configuring the anode. The anode bead is melted and joined to the other end of the alkali-free glass tube, via the end surface part of the anode bead. Then, the flash discharge tube may be configured further including the cathode bead made of the borosilicate glass. The cathode bead hermetically seals the other discharge electrode including the other tungsten pin such that the cathode bead has the side surface part having the outer diameter of which is approximately equal to the inner diameter of the joint glass tube. The cathode is configured with the other tungsten pin together with the sintered electrode fastened at the tip part of the cathode. The cathode bead is melted and joined inside the joint glass tube, via the side surface part of the cathode bead.

With this configuration, the anode bead and the joint glass tube are each welded to the thickness part of the corresponding end surface of the alkali-free glass tube. This allows their welding to be made not in the radial but in the axial direction of the alkali-free glass tube. As a result, this allows a great reduction in the occurrence of problems such as a leakage, for example, via a detachment phenomenon caused by the differences in thermal expansion coefficients between the welded members.

In addition, it is possible to perform the hermetic sealing process between the cathode and the envelope in a similar way to conventional manners; that is, the hermetic sealing is formed via the joint glass tube made of the conventionally-used borosilicate glass. Accordingly, conventional manufacturing facilities, process conditions, etc. can be used for the hermetic sealing process. This makes it possible to manufacture the flash discharge tubes having excellent characteristics, without reduction in productivity.

Moreover, in the flash discharge tube according to the present invention, the alkali-free glass tube may be configured with an aluminosilicate glass tube.

In accordance with the configuration, the softening point of the aluminosilicate glass tube is so high, relative to the borosilicate glass tube, that the process temperature for the aluminosilicate glass tube is high. Nevertheless, the aluminosilicate glass tube can be processed at much lower temperatures than are required for processing quartz glass tubes. For this reason, the flash discharge tube according to the present invention can be improved in process-workability of the hermetic sealing steps for manufacturing the anode and the cathode, over other flash discharge tubes using quartz glass tubes which additionally require intermediate glass bodies and the like.

Furthermore, in the flash discharge tube according to the present invention, the trigger electrode may be disposed on the outer surface of the envelope provided that the outer surface excludes both end parts of the alkali-free region.

Moreover, in the flash discharge tube according to the present invention, the trigger electrode may be formed with a transparent conductive film.

In accordance with these configurations, the trigger voltage can be applied in the same manner as for conventional configurations, with energy consumption in the trigger electrode being reduced.

Furthermore, the light-emitting device according to the present invention may be equipped with the flash discharge tube described above as a light source load.

In accordance with the configurations, it is possible to use the flash discharge tube, as a light source, which features excellent durability and the increased number of firing times in a short-interval continuous-firing operation. The configurations can provide the light-emitting device which features excellent durability to withstand arc discharge phenomena and excellent short-interval continuous-firing operation characteristics (repetitive-firing characteristics).

INDUSTRIAL APPLICABILITY

The technology according to the present invention is applicable to areas including flash discharge tubes that are desired to provide cheap prices, high durability to high-power flashings, and excellent short-interval repetitive-firing characteristics, and to areas including light-emitting devices equipped with the flash discharge tubes.

The invention claimed is:

1. A flash discharge tube comprising:
a light-transmitting envelope;
a pair of discharge electrodes configured with an anode and a cathode which are respectively hermetically sealed at both ends of the envelope with xenon gas being sealed inside the envelope;
a trigger circuit for outputting a trigger signal; and
a trigger electrode disposed on an outer surface of the envelope, the trigger signal being applied to the trigger electrode,
wherein the pair of the discharge electrodes includes tungsten pins disposed inside the envelope, the pins facing each other;
the envelope includes a central region configured with an alkali-free glass except for quartz glass, the central region serving as an alkali-free region and becoming in a high temperature state during a firing operation of the flash discharge tube, the central region being smaller than a maximum region enclosing a gas-tight space formed by hermetically sealing the pair of the discharge electrodes and being not smaller than a minimum region enclosing an arc-discharge space formed between the tungsten pins of the pair of the discharge electrodes, the alkali-free region containing either no alkali metal component or not larger than a predetermined amount of an alkali metal component; and
the trigger electrode is disposed in the alkali-free region.

2. The flash discharge tube according to claim 1, wherein the envelope further includes:
an alkali-free glass tube made of the alkali-free glass except for quartz glass, the alkali-free glass tube forming the arc-discharge space serving as the alkali-free region, the arc-discharge space enclosing at least an arc-discharge region, the alkali-free glass tube having an inner diameter and an outer diameter;
a joint glass tube made of a borosilicate glass, the joint glass tube having an inner diameter and an outer diameter which are either equal or approximately equal to the inner diameter and the outer diameter of the alkali-free glass tube, respectively, the joint glass tube being melted and joined to an end surface of one end of the alkali-free glass tube;
an anode bead made of the borosilicate glass, the anode bead being hermetically welded to one of the discharge electrodes such that the anode bead has an end surface part having an outer diameter approximately equal to the outer diameter of the alkali-free glass tube, the one of the discharge electrodes including a corresponding one of the tungsten pins, the corresponding tungsten pin configuring the anode, the anode bead being melted and joined to the other end of the alkali-free glass tube via the end surface part; and
a cathode bead made of the borosilicate glass, the cathode bead being hermetically welded to the other of the discharge electrodes such that the cathode bead has a side surface part having an outer diameter approximately equal to the inner diameter of the joint glass tube, the other of the discharge electrodes including the other of the tungsten pins, the cathode being configured with the other tungsten pin together with a sintered electrode fastened to a tip part of the cathode, the cathode bead being melted and joined in an inside of the joint glass tube via the side surface part.

3. The flash discharge tube according to claim 2, wherein the alkali-free glass tube is an aluminosilicate glass tube.

4. The flash discharge tube according to claim 1, wherein the trigger electrode is disposed on the outer surface of the envelope, the outer surface excluding both end parts of the alkali-free region.

5. The flash discharge tube according to claim 4, wherein the trigger electrode is a transparent conductive film.

6. A light-emitting device comprising the flash discharge tube according to claim 1 as a light source load.

* * * * *